(12) United States Patent
Hasebe et al.

(10) Patent No.: US 7,390,020 B2
(45) Date of Patent: Jun. 24, 2008

(54) AIRBAG AND AIRBAG APPARATUS

(75) Inventors: Masahiro Hasebe, Hikone (JP); Yukitoshi Narimoto, Oumihachiman (JP)

(73) Assignee: Takata Corporation, Tokyo (JP)

( * ) Notice: Subject to any disclaimer, the term of this patent is extended or adjusted under 35 U.S.C. 154(b) by 245 days.

(21) Appl. No.: 11/206,203

(22) Filed: Aug. 18, 2005

(65) Prior Publication Data

US 2006/0066089 A1 Mar. 30, 2006

(30) Foreign Application Priority Data

Sep. 24, 2004 (JP) ............................. 2004-277487

(51) Int. Cl.
*B60R 21/16* (2006.01)
*B60R 21/231* (2006.01)

(52) U.S. Cl. .................................... 280/743.2

(58) Field of Classification Search ................ 280/729, 280/743.1, 743.2, 730.1
See application file for complete search history.

(56) References Cited

U.S. PATENT DOCUMENTS

| | | | | |
|---|---|---|---|---|
| 3,879,056 A | * | 4/1975 | Kawashima et al. | ..... 280/743.2 |
| 5,213,361 A | | 5/1993 | Satoh et al. | |
| 5,380,038 A | * | 1/1995 | Hawthorn et al. | ......... 280/730.1 |
| 6,595,549 B2 | * | 7/2003 | Bohn et al. | ............... 280/743.1 |
| 6,802,534 B2 | | 10/2004 | Neupert | |
| 7,121,584 B2 | * | 10/2006 | Hasebe et al. | ............. 280/743.2 |
| 2004/0145161 A1 | * | 7/2004 | Hasebe et al. | ................ 280/729 |
| 2004/0160048 A1 | | 8/2004 | Hasebe et al. | |
| 2004/0164526 A1 | * | 8/2004 | Hasebe et al. | ............... 280/729 |
| 2004/0232681 A1 | | 11/2004 | Adomeit | |

FOREIGN PATENT DOCUMENTS

| | | |
|---|---|---|
| EP | 1 452 403 | 9/2004 |
| JP | S49-23176 | 6/1974 |
| JP | H04-292239 | 10/1992 |
| JP | 10-071911 | 3/1998 |
| JP | 100719111 | 3/1998 |

* cited by examiner

*Primary Examiner*—Eric Culbreth
*Assistant Examiner*—Joseph Rocca
(74) *Attorney, Agent, or Firm*—Manabu Kanesaka

(57) ABSTRACT

In an airbag, a distal side is inflated away from a proximal side with an inflator disposed on the proximal side. The airbag includes a left airbag section, a right airbag section, and a belt strap disposed in one of the left and right airbag sections located closer to a vehicle body side for connecting a portion of the airbag section on the vehicle body side and an opposite portion. A height H1 in a vertical cross section from a lowest level to a joint portion between the belt strap and the portion is within a range from 0.4 H to 0.8 H, wherein H represents an entire height. A height H2 from the joint portion between the belt strap and the opposite portion is within a range from 0.3 H to 0.6 H, and is smaller than H1.

12 Claims, 4 Drawing Sheets

AIRBAG AND AIRBAG APPARATUS

BACKGROUND OF THE INVENTION AND RELATED ART STATEMENT

The present invention relates to an airbag and an airbag apparatus for protecting a passenger in case of collision of a vehicle or the like and, more specifically, to an airbag and an airbag apparatus including a left airbag section and a right airbag section to be inflated on a left side and a right side in front of the passenger, respectively.

As an airbag for protecting a passenger upon collision of the vehicle or the like, an airbag having a left airbag section and a right airbag section to be inflated on a left side and a right side in front of the passenger respectively by a common inflator is disclosed in Japanese Patent Publication (Kokai) No. 4-292239. In the airbag, the left airbag section and the right airbag section are connected to each other by a tie panel at distal end portions thereof.

The airbag is stored in a case in a folded state and is covered by a cover. When an inflator (gas generator) is activated and ejects gas upon collision of the vehicle, the airbag is inflated in front of the passenger while pushing and opening the cover.

The inflator is disposed inside or outside the airbag at a proximal side thereof. In the airbag apparatus having a structure in which the inflator is disposed outside the airbag at the proximal side thereof, gas ejected from the inflator is supplied into the airbag via a gas introduction port provided on the proximal side of the airbag.

When the inflator is disposed inside the airbag on the proximal side, the entire inflator may be disposed in the airbag or a part of the inflator may be disposed in the airbag. As an example of the latter case, a pair of slit-shaped openings is provided in the airbag, and the rod-shaped inflator is passed through the slit-shaped openings, so that both ends of the inflator project from the airbag.

Patent Document 1: Japanese Patent Publication (Kokai) No. 4-292239

In the airbag having the left airbag section and the right airbag section as disposed in Japanese Patent Publication (Kokai) No. 4-292239, when the left airbag section and the right airbag section in the inflated state have large capacities, it is necessary to employ an inflator having a large capacity in order to inflate the airbag quickly.

In the airbag disclosed in Japanese Patent Publication (Kokai) No. 4-292239, the left airbag section and the right airbag section are connected to each other at the distal end portions thereof by the tie panel. Accordingly, a lateral center of a passenger body is received by the tie panel when the airbag is inflated.

In the airbag disclosed in Japanese Patent Publication (Kokai) No. 4-292239, when the left airbag section and the right airbag section are inflated, gas from the inflator flows more in one of the airbags and hence inflation of the other airbag may be delayed in comparison with the one of the airbags.

In the airbag disposed in Japanese Patent Publication (Kokai) No. 4-292239, the left airbag section and the right airbag section are connected by the tie panel. Accordingly, even when inflation of one of the airbags is delayed, the airbag inflated earlier can pull the airbag which is delayed in inflation via the tie panel in the direction of inflation to promote inflation thereof. Since the tie panel connects the left airbag section and the right airbag section to each other at the distal end portions, the airbag which starts inflation earlier can not pull the airbag which is delayed in inflation sufficiently until the distal side thereof is inflated.

In view of the problems described above, an object of the present invention is to provide an airbag and an airbag apparatus in which a left airbag section and a right airbag section are inflated sufficiently quickly even when a capacity of an inflator is relatively small, while interference with an A-pillar and the like when being inflated is prevented.

Another object of the present invention is to provide an airbag and an airbag apparatus in which a left chest portion of a passenger is received by an inflated left airbag section, a right chest portion thereof is received by a right airbag section, and a space of the inflated airbag is opposed to a lateral center of the passenger chest.

A further object of the present invention is to provide an airbag and an airbag apparatus in which a left airbag section and a right airbag section are inflated smoothly and evenly from an early stage of inflation.

Further objects and advantages of the invention will be apparent from the following description of the invention.

SUMMARY OF THE INVENTION

In order to attain the objects described above, according to the present invention, an airbag is arranged such that a distal side thereof is inflated in a direction away from a proximal side thereof by gas ejected from an inflator disposed on the proximal side. The airbag includes a left airbag section to be inflated on a left side in front of a passenger, and a right airbag section to be inflated on a right side in front of the passenger. At least one of the left airbag section and the right airbag section located closer to a side surface of a vehicle cabin, that is, on a vehicle body side, is provided with a belt strap for connecting a vehicle body side of the airbag section on the vehicle body side and an opposite side of the airbag section on the vehicle body side. Accordingly, a height H1 from a lowest level of the airbag where the belt strap is formed to a joint portion between the belt strap and the airbag on the vehicle body side of the airbag section on the vehicle body side in a vertical cross section in a width direction passing through the belt strap when the airbag section on the vehicle body side is completely inflated is within a range from 0.4×H to 0.8×H, wherein H is an entire height of the vertical cross section of the bag. Further, a height H2 from the lowest level to a joint portion between the belt strap and the bag on the opposite side of the airbag section on the vehicle body side in the vertical cross section is within a range from 0.3×H to 0.6×H, and is smaller than H1.

According to a second aspect, in the airbag in the first aspect, (H1-H2) is within a range from 0.1×H to 0.5×H.

According to a third aspect, in the airbag in one of the first and second aspects, the distal end portions of the left airbag section and the right airbag section are not connected. When the airbag is inflated, a space opening toward the passenger is formed between the distal end portions of the left airbag section and the right airbag section.

According to a fourth aspect, in the airbag in one of the first and third aspects, midsections of the left airbag section and the right airbag section in the inflation direction are connected to each other.

According to a fifth aspect, in the airbag in the fourth aspect, opposed portions of the left airbag section and the right airbag section are connected to each other by a joint member extending in the direction of connection thereof.

According to a sixth aspect of the present invention, an airbag apparatus includes the airbag according to the present invention and an inflator for inflating the airbag.

According to the airbag and the airbag apparatus of the present invention, as least the vehicle body side bag is provided with the belt strap for connecting the vehicle body side and the opposite side of the airbag section on the vehicle body side, and hence the lateral width thereof is limited in the inflated state. Accordingly, even when the inflator of a small capacity is employed, the airbag is inflated sufficiently quickly.

The airbag section on the vehicle body side is configured in such a manner that the height H1 of the joint portion between the belt strap and the bag on the vehicle body side is within the range from 0.4×H to 0.8×H. The height H2 of the joint portion between the belt strap and the bag on the opposite side is within the range from 0.3×H to 0.6×H, and is smaller than H1. Accordingly, a portion of the inflated airbag section on the vehicle body side near the joint portion of the belt strap on the vehicle body side is pulled inwardly and downwardly of the bag by the belt strap. Therefore, the upper portion of the vehicle body side of the inflated airbag section on the vehicle body side is prevented from being interfered with an A-pillar or a member near by.

In particular, (H1-H2) is set from 0.1×H to 0.5×H. Accordingly, a pulling amount of the upper portion of the vehicle body side of the inflated airbag section on the vehicle body side downward may be set to a large value.

In the present invention, a structure in which the distal end portions of the left airbag section and the right airbag section are not connected to each other. When the airbag is inflated, the space opening toward the passenger is defined between the distal end portions of the left airbag section and the right airbag section.

When the airbag is inflated, the left airbag section receives a left chest of the passenger and the right airbag section receives a right chest of the passenger. Hard and strong rib bones are located at left and right chest regions. The airbag receives and absorbs an impact from the passenger via the rib bones. The airbag includes the space between the distal end portions of the left airbag section and the right airbag section in the inflated state, and the portion of the breast bone at the chest center of the passenger faces the space. Therefore, when the body of the passenger is crushed into the airbag, the portion near the breast bone of the chest is prevented from receiving a large reaction force from the airbag, and hence a burden to be exerted on the breast bone can be reduced.

In the present invention, the midsections of the left airbag section and the right airbag section in the direction of inflation are connected to each other. When the midsections are connected to each other as described above, even when inflation of one of the airbags is delayed upon inflation of the airbag, the airbag which is inflating earlier pulls the one airbag which is delayed in inflation to promote the inflation thereof. In addition, since the midsections of the left airbag section and the right airbag section in the direction of inflation are connected to each other, the other bag which starts inflation earlier starts pulling the one airbag which is delayed in inflation and inflated to the midsection in the early stage. Accordingly, both of the left airbag section and the right airbag section are inflated smoothly and evenly from the initial stage of inflation.

In the airbag in which the midsections of the left airbag section and the right airbag section in the direction of inflation are connected to each other, the opposed portions of the left airbag section and the right airbag section may be connected by the joint member extending in the joint direction thereof. With this arrangement, the distance between the inflated left airbag section and the right airbag section can be limited by a length of the joint member.

DETAILED DESCRIPTION OF PREFERRED EMBODIMENTS

Hereunder, embodiments of the present invention will be described with reference to the accompanying drawings.

Figure 1A:
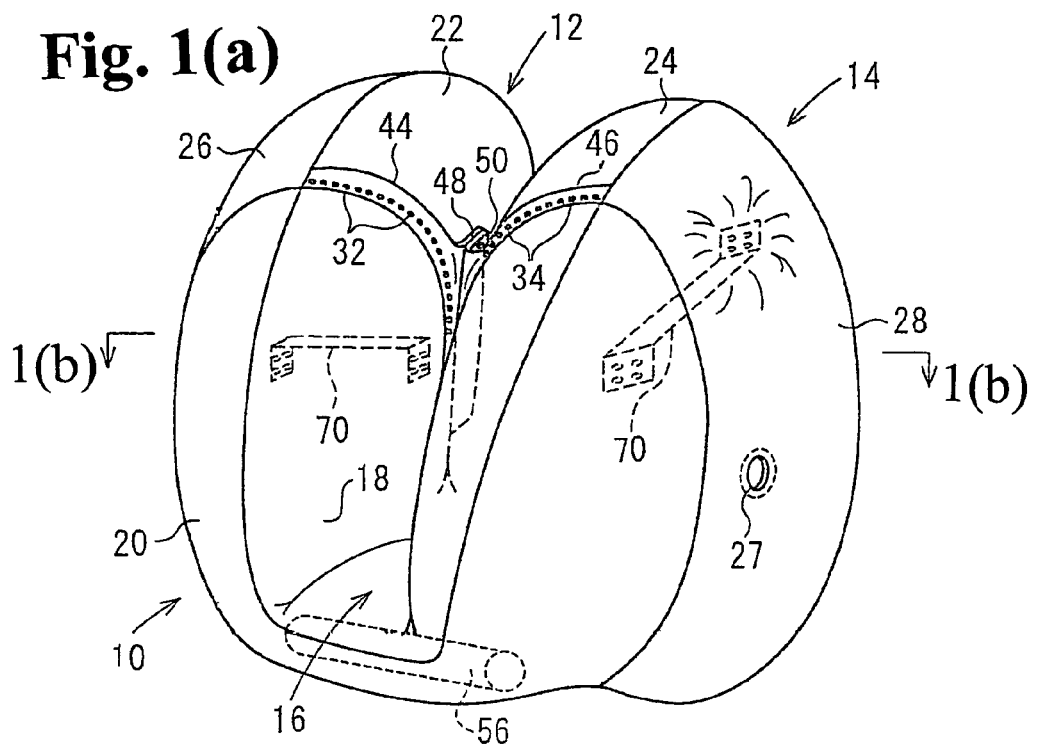
FIGS. 1(a) and 1(b) are views showing a structure of an airbag according to an embodiment of the present invention.
Figure 1B:
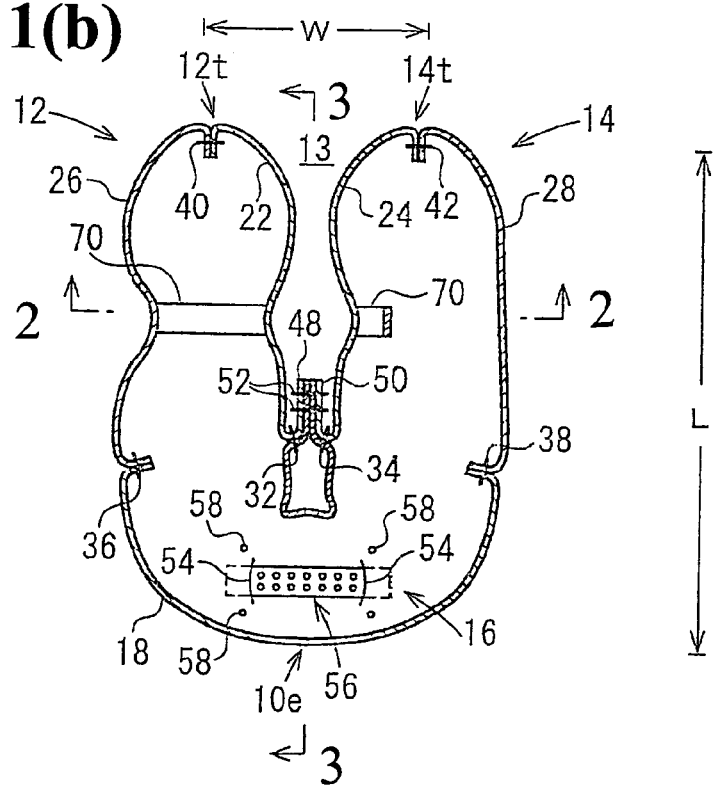
Figure 2:
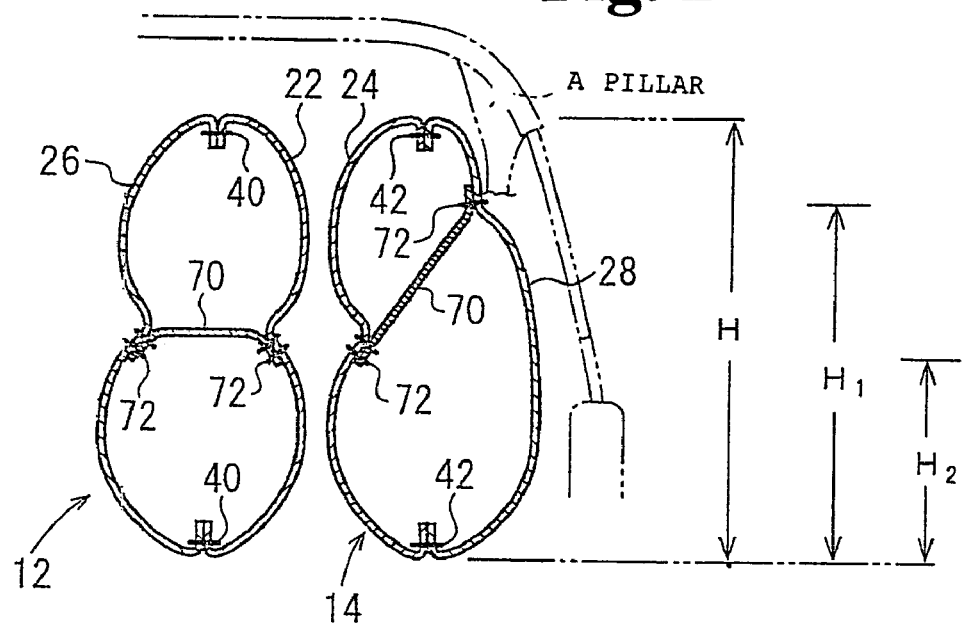
FIG. 2 is a cross-sectional view taken along line 2-2 in FIG. 1(b)
Figure 3:
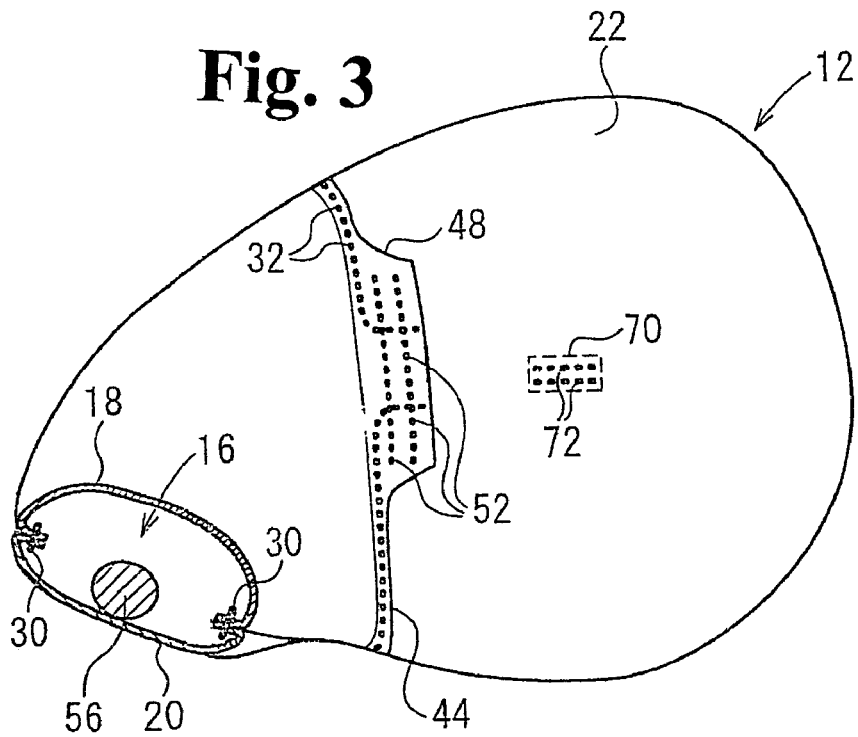
FIG. 3 is a cross-sectional view taken along line 3-3 in FIG. 1(b)
Figure 4A:
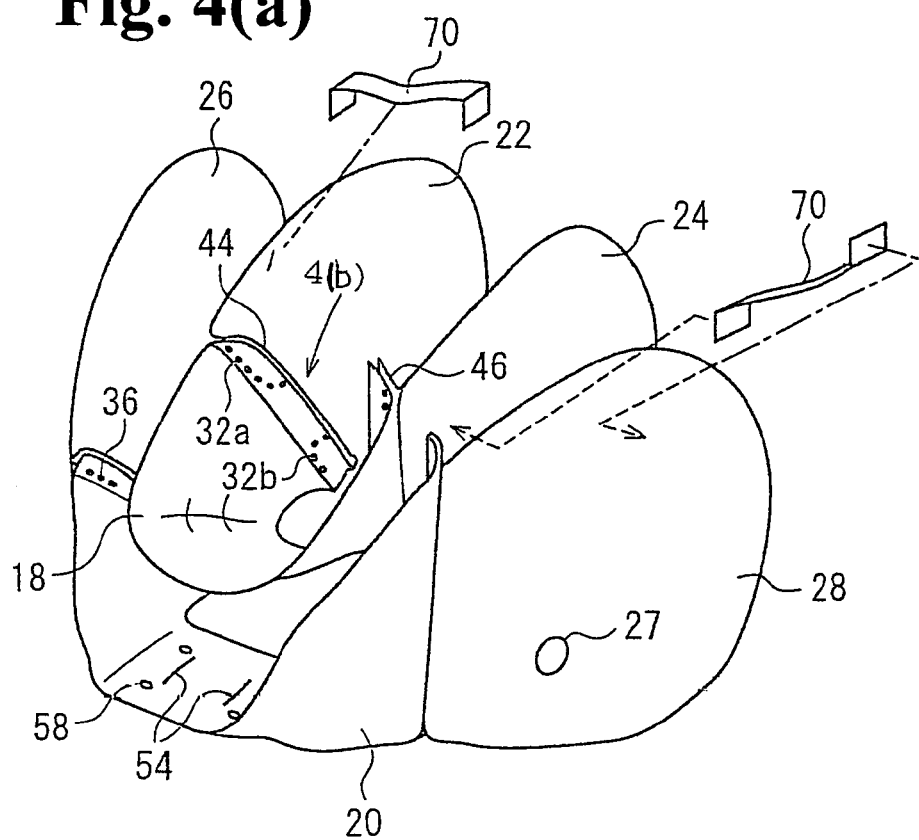
FIGS. 4(a) and 4(b) are an exploded perspective view and an enlarged view of a principal portion of the airbag in FIGS. 1(a) and 1(b)
Figure 4B:
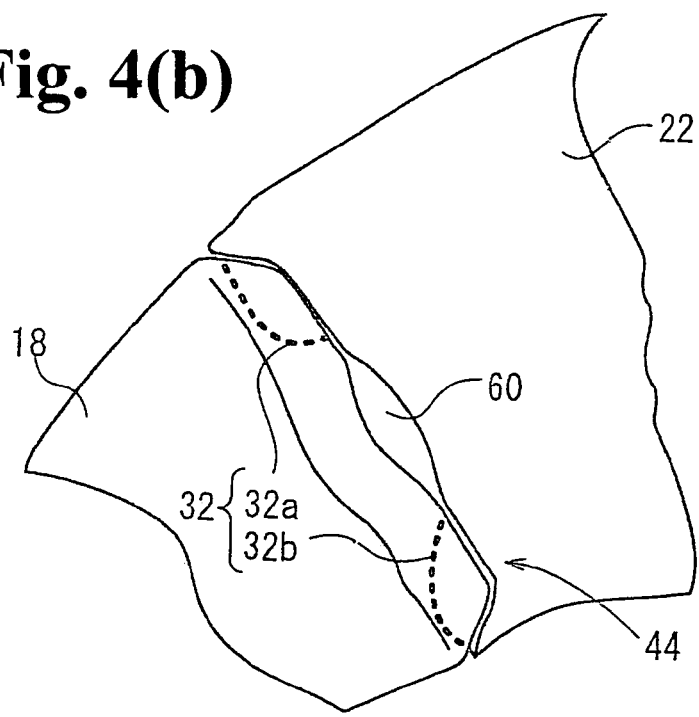

FIG. 1(a) is a perspective view of an airbag in an inflated state according to an embodiment of the present invention, and FIG. 1(b) is a cross-sectional view taken along line 1(b)-1(b) in FIG. 1(a). FIG. 2 is a cross-sectional view taken along line 2-2 in FIG. 1(b). FIG. 3 is a cross-sectional view taken along line 3-3 in FIG. 1(b). FIG. 4(a) is an exploded perspective view of the airbag; and FIG. 4(b) is an enlarged view of a portion 4(b) in FIG. 4(a). The airbag is installed as an airbag of a passenger airbag apparatus in an instrument panel of a vehicle having a passenger seat on a front left side. In the following description, a left airbag section and a right airbag section may be referred to simply as a bag.

An airbag 10 includes a right airbag section 12 to be inflated on a right side (on a side of a console in this embodiment) in front of a passenger, a left airbag section 14 to be inflated on a left side (vehicle body side) in front of the passenger, and a communicating section 16 which communicates the right airbag section 12 and the left airbag section 14 with each other at one end sides thereof. The communicating section 16 corresponds to a proximal side of the airbag 10. The respective bags 12 and 14 are inflated in a direction away from the communicating section 16, respectively.

The respective bags 12 and 14 are provided with belt straps 70 as width limiting means for limiting the lateral width of the respective bags upon inflation. The belt straps 70 are joined to front inner panels 22 and 24 and front outer panels 26 and 28 which constitute left and right side surfaces of the respective bags 12 and 14 via seams 72.

The belt straps 70 are located at substantially near the centers of the respective bags 12 and 14 in a front-to-rear direction of the vehicle body. In the right airbag section 12, the belt strap 70 connects portions near the vertical centers of the respective panels 22 and 26. In the left airbag section 14, one end of the belt strap 70 is connected to a portion near the vertical center of the panel 24, and the other end thereof is connected to an upper portion of the vehicle body side panel 28. In the left airbag section 14, the belt strap 70 may be connected to a lower portion of the panel 24.

Figure 5:
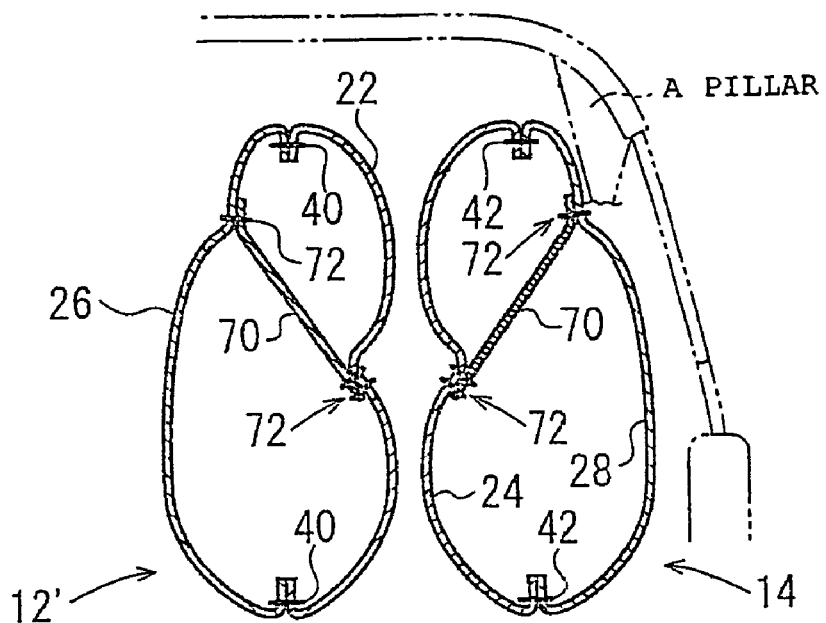
FIG. 5 is a cross-sectional view of an airbag according to another embodiment of the present invention.

As shown in FIG. 2, H represents an entire height of the vertical cross section in a width direction of the bag passing through the belt strap 70 of the bag 14 when inflation is completed. Also, H1 represents a height from a lowest level of the bag 14 to a joint portion between the belt strap 70 and the vehicle body side panel 28 in the vertical cross section. Further, H2 represents a height from a lowest level to a joint portion between the belt strap 70 and the opposite side panel 24 in the vertical cross section. H1 is within a range from 0.4×H to 0.8×H, and H2 is within a range from 0.3×H to 0.6×H, and a relation therebetween is H1>H2. A difference between H1 and H2, i.e., (H1-H2), is preferably within a range from 0.1×H to 0.5×H, in particular, within a range from 0.2×H to 0.4×H. As shown in FIG. 5 (described later), it is the same also in the case in which the belt strap of the right airbag section is extended in an oblique direction.

When the right airbag section 12 and the left airbag section 14 are inflated, the width is limited by the belt strap 70. In the airbag 10, a midsection of the right airbag section 12 in the direction of inflation and the midsection of the left airbag section 14 in the direction of inflation are connected by a seam 52.

In this embodiment, an outline of the airbag 10 is defined by panels 18, 20, 22 and 24, 26, and 28. The panel 18 (rear inner panel) constitutes opposed surfaces of the respective bags 12 and 14 on the proximal side and the passenger side of the communicating section 16. The panel 20 (rear outer panel) constitutes sides of the respective bags 12 and 14 on the opposite sides from the opposing sides, and constitutes a side of the communicating section 16 opposite to the passenger.

The panels 22 and 24 (front inner panels) constitute the opposed surfaces of the respective bags 12 and 14. The panels 26 and 28 (front outer panels) constitute surfaces opposite from the opposed surfaces of the respective bags 12 and 14.

Reference numeral 30 designates a seam (sewing thread) which stitches the rear inner panel 18 and the rear outer panel 20 together. Reference numerals 32 and 34 designate seams which stitch the rear inner panel 18 and the front inner panels 22 and 24 together. Reference numerals 36 and 38 designate seams which stitch the rear outer panel 20 and the front outer panels 26 and 28 together. The front outer panels 26 and 28 are respectively provided with vent holes 27.

As shown in FIG. 1(a), seam allowances (joint allowances) 44 and 46 between the rear inner panel 18 and the front inner panels 22 and 24 are disposed so as to be exposed to the outer surfaces of the respective bags 12 and 14. As shown in FIGS. 1(a)-1(b) and 3, tongue-shaped joint allowances 48 and 50 are formed so as to project from the seam allowances 44 and 46, and the joint allowances 48 and 50 are stitched together by the seam 52.

The rear outer panel 20 constituting the outer side surface of the communicating section 16 is provided with a pair of slits 54 for inserting the inflator. A rod-shaped inflator 56 is inserted and disposed in the slits 54.

The airbag 10 is fabricated in the following procedure. As shown in FIG. 4(a), the rear inner panel 18 and the front inner panels 22 and 24 are stitched together by the seams 32 and 34, and the rear outer panel 20 and the front outer panels 26 and 28 are stitched together by the seams 36 and 38. In this case, the seam allowances 44 and 46 between the rear inner panel 18 and the front inner panels 22 and 24 are disposed on the side exposed to the outside of the airbag in the airbag product.

In this embodiment, at the seam allowance 44 between the rear inner panel 18 and the front inner panel 22, as shown in FIG. 4(b), the rear inner panel 18 and the front inner panel 22 are stitched together at both ends of the seam allowance 44 by the seams 32 (32a and 32b), and an opening 60 for reversing the airbag is formed between the seams 32a and 32b.

Subsequently, a stitched body including the rear inner panel 18 and the front inner panels 22 and 24 and a stitched body including the rear outer panel 20 and the front outer panels 26 and 28 are stitched together by seams 30, 40, and 42. Both ends of the belt strap 70 are sewed to the panels 22 and 26 and the panels 24 and 28. Accordingly, an intermediate body of the airbag product in the reversed state is fabricated.

Subsequently, the intermediate body of the airbag product is reversed to turn inside out through the opening 60 formed at the seam allowance 44. Then, the joint allowances 48 and 50 are stitched together by the seam 52 whereby the airbag 10 product is completed. When stitching the joint allowances 48 and 50 together, the opening 60 is closed by the seam 52.

The airbag 10 is folded and stored in the case, and connected to the case by a bolt (not shown) passing through a bolt insertion hole 58 (FIG. 1(b)). A lid is mounted to the case so as to cover the folded body of the airbag 10. The airbag apparatus is installed in the instrument panel in front of the passenger seat of the vehicle. Upon collision of the vehicle, the inflator 56 is activated and ejects gas, and the right airbag section 12 and the left airbag section 14 are inflated on the right side and the left side in front of the passenger, respectively.

In the airbag 10, the respective lateral widths of the right airbag section 12 and the left airbag section 14 after being inflated are limited by the belt straps 70. Accordingly, capacities of the right airbag section 12 and the left airbag section 14 are relatively small. Therefore, even though the inflator 56 having a small capacity is employed, the right airbag section 12 and the left airbag section 14 are inflated sufficiently quickly.

In this embodiment, H1 is within the range from 0.4×H to 0.8×H, H2 is within the range from 0.3×H to 0.6×H, and H1 >H2 as described above. Accordingly, when the left airbag section 14 is inflated, the upper portion and the intermediate portion on the vehicle body side are pulled inwardly and downwardly by the belt straps 70. In particular, when (H1-H2) is set to within the range from 0.1×H to 0.5×H, particularly to within the range from 0.2×H to 0.4×H, the upper portion to the intermediate portion on the vehicle body side is significantly pulled downwardly. Therefore, as shown in FIG. 2, the upper portion of the left airbag section 14 on the vehicle body side does not interfere with an A-pillar, a windshield, a side door, and the like in the vicinity thereof.

In the embodiment, the midsection of the right airbag section 12 and the left airbag section 14 are connected by the seam 52. Accordingly, when the airbag 10 is inflated, even if one of the bags 12 and 14 is inflated earlier and inflation of the other of the bags 14 and 12 is delayed, one of the bags which starts inflation earlier pulls the other bag which is delayed in inflation in the direction of inflation in the relatively early stage. Accordingly, the respective left and right bags 12 and 14 are inflated smoothly and evenly from the early stage of inflation.

In a state in which inflation of the airbag 10 is completed, a space 13 is formed between the distal end portions of the right airbag section 12 and the left airbag section 14, and the space 13 is opened toward the passenger. The inflated right airbag section 12 receives the right chest of the passenger, the inflated left half airbag section 14 receives the left chest, and the portion near rib bones opposes the space 13. Therefore, a reaction force applied to the portion near the rib bones when receiving the airbag is reduced.

In the state in which inflation of the airbag 10 is completed, a distance W between a distal end 12t of the right airbag section 12 and a distal end 14t of the left airbag section 14 is preferably within a range from 150 to 450 mm, more preferably within a range from 170 to 430 mm.

In the above-described embodiment, one end of the belt strap 70 is connected to the upper portion of the outer panel (panel on the vehicle body side) 28 only in the left airbag section 14. It is also possible to connect the belt strap 70 to the upper portion of the outer panel 26 of the console-side bag as in a right airbag section 12' shown in FIG. 5. In this arrangement, the airbag apparatus can be mounted commonly on vehicles with a left-hand steering wheel and vehicles with a right-hand steering wheel. It is also possible to equalize the capacity of the left and right bags and equalize the internal pressure when being inflated.

Figure 6:
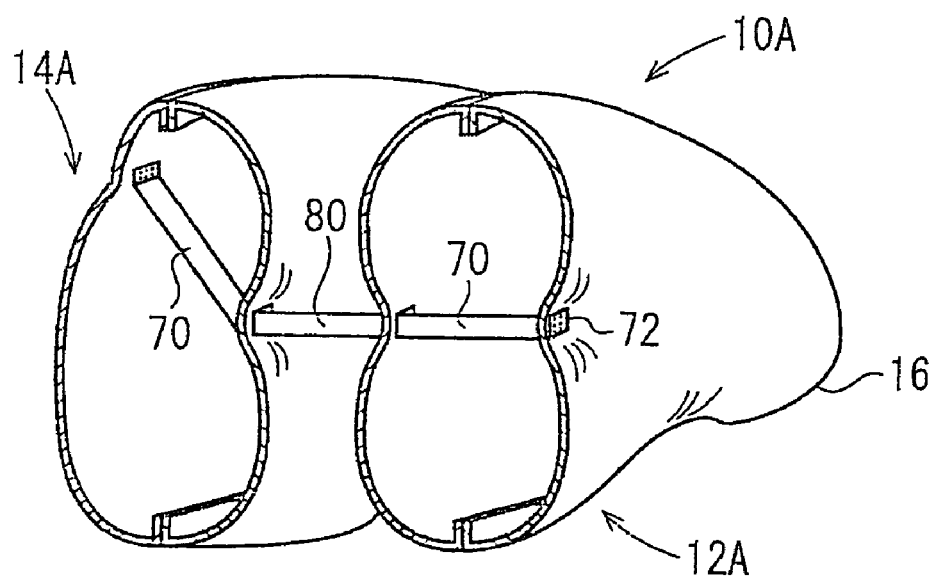
FIG. 6 is a cross-sectional perspective view of an airbag according to a further embodiment of the present invention.

In the above-described embodiment, the midsections of the left and right bags 12 and 14 are connected by stitching the joint allowances 48 and 50 provided respectively together. Alternatively, as in an airbag 10A shown in FIG. 6, it is also possible to connect midsections of a right airbag section 12A and a left airbag section 14A via a belt 80. Other reference numerals in FIG. 6 show the identical portions in FIGS. 1(a) and 1(b) to FIG. 5. A string, net, or panel may be used instead of the belt 80.

In the above-described embodiment, the side surfaces on the left and right sides of the right airbag section 12 and the left airbag section 14 are connected by the single belt strap 70, respectively, and the side surfaces may be connected by two or more belt straps. It is also possible to provide the belt straps for connecting the upper surfaces and the lower surfaces of the right airbag section 12 and the left airbag section 14 to limit the vertical width when the respective airbags 12 and 14 are inflated.

The above-described embodiments are presented for demonstrating one example of the present invention, and the present invention is not limited to the mode shown in the drawings. For example, the right airbag section and the left airbag section are connected on the proximal side in the above-described embodiment, and the both bags may be separate members. Alternatively, the left airbag section and the right airbag section may be adapted to be inflated by independent inflators.

The disclosure of Japanese Patent Application No. 2004-277487, filed on Sep. 24, 2004, is incorporated in the application.

While the invention has been explained with reference to the specific embodiments of the invention, the explanation is illustrative and the invention is limited only by the appended claims.

What is claimed is:

1. An airbag comprising:
   a left airbag section to be inflated on a left side in front of a passenger,
   a right airbag section to be inflated on a right side in front of the passenger, and formed separately from the left airbag section,
   a communicating section connected to one end of the left airbag section and one end of the right airbag section, and
   a first belt strap disposed in one of the left airbag section and the right airbag section located closer to a vehicle body side, said first belt strap connecting a first portion of the one of the left airbag section and the right airbag section on the vehicle body side and a second portion opposite thereto so that when the one of the left and right airbag sections with the first belt strap is completely inflated, a height H1 from a lowest level of the airbag where the first belt strap is formed to the first portion in a vertical cross section is within a range from 0.4 H to 0.8 H, and a height H2 from the lowest level to the second portion in the vertical cross section is within a range from 0.3 H to 0.6 H and is smaller than H1, wherein H represents an entire height of the airbag where the belt trap is formed in vertical cross section,
   wherein said first portion is located adjacent to an upper corner of the one of the left and right airbag sections on the vehicle body side so that when the one of the left and right airbag sections is completely inflated, the upper corner is pulled inwardly by the second portion to form an inclined shape at the upper corner.

2. An airbag according to claim 1, wherein distal sides of the left and right airbag sections are inflated in a direction away from proximal sides thereof by gas ejected from an inflator disposed on the proximal side.

3. An airbag according to claim 1, wherein a difference between H1 and H2 is within a range from 0.1 H to 0.5 H.

4. An airbag according to claim 1, wherein said left airbag section and said right airbag section include distal ends unconnected to each other so that a space toward the passenger is formed between the distal ends when the left and right airbag sections are inflated.

5. An airbag according to claim 1, wherein said left and right airbag sections include midsections in a direction that the left and right airbag sections are inflated, said midsections being connected with each other.

6. An airbag according to claim 5, further comprising a joint member for connecting opposed portions of the left airbag section and the right airbag section.

7. An airbag according to claim 1, further comprising a second belt trap disposed in the other of the left airbag section and the right airbag section for connecting left and right panels thereof.

8. An airbag according to claim 7, wherein said second belt trap is arranged symmetrically to the first belt trap relative to a center plane between the left and right airbag sections.

9. An airbag apparatus comprising the airbag according to claim 1 and the inflator for inflating the airbag.

10. An airbag according to claim 1, wherein each of the left and right airbag sections is completely surrounded by panels forming each of the left and right airbag sections except for the communicating section.

11. An airbag according to claim 10, wherein said first belt strap is one strap connecting obliquely opposed sides of the panels forming the one of the left and right airbag sections in a width direction where the left and right airbag sections are arranged.

12. An airbag according to claim 11, further comprising a second belt strap formed in the other of the left and right airbag sections, said second belt strap horizontally connecting opposed sides of the panels forming the other of the left and right airbag sections.

* * * * *